United States Patent
Haug

(10) Patent No.: US 10,288,136 B2
(45) Date of Patent: May 14, 2019

(54) BRAKE DISC COATING MADE FROM AN IRON ALLOY COMPOSITION AND METHOD FOR THE PRODUCTION THEREOF

(71) Applicant: Daimler AG, Stuttgart (DE)

(72) Inventor: Tilmann Haug, Weissenhorn (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/124,560

(22) PCT Filed: Mar. 6, 2015

(86) PCT No.: PCT/EP2015/000518
§ 371 (c)(1),
(2) Date: Sep. 8, 2016

(87) PCT Pub. No.: WO2015/135639
PCT Pub. Date: Sep. 17, 2015

(65) Prior Publication Data
US 2017/0016497 A1    Jan. 19, 2017

(30) Foreign Application Priority Data

Mar. 11, 2014 (DE) .................. 10 2014 003 581
Mar. 29, 2014 (DE) .................. 10 2014 004 616

(51) Int. Cl.

| | |
|---|---|
| *B32B 15/00* | (2006.01) |
| *F16D 65/12* | (2006.01) |
| *C23C 30/00* | (2006.01) |
| *F16D 69/02* | (2006.01) |
| *C23C 4/073* | (2016.01) |
| *C22C 38/02* | (2006.01) |
| *C22C 38/04* | (2006.01) |
| *C22C 38/06* | (2006.01) |
| *C22C 38/18* | (2006.01) |
| *C22C 38/40* | (2006.01) |
| *C23C 4/02* | (2006.01) |
| *C23C 4/18* | (2006.01) |

(52) U.S. Cl.
CPC ............ *F16D 65/127* (2013.01); *C22C 38/02* (2013.01); *C22C 38/04* (2013.01); *C22C 38/06* (2013.01); *C22C 38/18* (2013.01); *C22C 38/40* (2013.01); *C23C 4/02* (2013.01); *C23C 4/073* (2016.01); *C23C 4/18* (2013.01); *C23C 30/00* (2013.01); *F16D 65/12* (2013.01); *F16D 69/02* (2013.01); *F16D 2200/003* (2013.01); *F16D 2200/0008* (2013.01); *F16D 2200/0013* (2013.01); *F16D 2250/0046* (2013.01)

(58) Field of Classification Search
None
See application file for complete search history.

(56) References Cited

U.S. PATENT DOCUMENTS

| | | |
|---|---|---|
| 4,278,153 A | 7/1981 | Venkatu |
| 7,261,192 B2 | 8/2007 | Khambekar et al. |
| 2004/0031652 A1 | 2/2004 | Khambekar et al. |
| 2007/0023242 A1* | 2/2007 | Krueger ............... F16D 65/125 188/218 XL |
| 2007/0144839 A1 | 6/2007 | Seksaria et al. |
| 2010/0196637 A1 | 8/2010 | Lippert et al. |

FOREIGN PATENT DOCUMENTS

| | | |
|---|---|---|
| CN | 101497977 A | 8/2009 |
| CN | 103374691 A | 10/2013 |
| DE | 10 2006 004 156 A1 | 8/2007 |
| DE | 10 2008 035 849 A1 | 2/2010 |
| EP | 1 336 054 B1 | 8/2003 |
| EP | 1029098 * | 6/2006 ............ C22C 38/08 |
| GB | 2 186 886 A | 8/1987 |
| JP | 55-107133 A | 8/1980 |
| JP | 59-229467 A | 12/1984 |
| JP | 62-240746 A | 10/1987 |
| JP | 8-145092 A | 6/1996 |
| JP | 2002-146496 A | 5/2002 |
| JP | 2004-513311 A | 4/2004 |
| JP | 2005-36312 A | 2/2005 |
| JP | 2010-523363 A | 7/2010 |
| WO | WO 03/104513 A1 | 12/2003 |
| WO | WO 2007/043961 A1 | 4/2007 |

OTHER PUBLICATIONS

Japanese Office Action issued in Japanese counterpart application No. 2016-556289 dated Sep. 26, 2017, with partial English translation (Seven (7) pages).
PCT/EP2015/000518, International Search Report dated May 26, 2015 (Two (2) pages).
Chinese Office Action issued in Chinese counterpart application No. 201580012696.2 dated Dec. 26, 2017, with partial English translation (Nine (9) pages).

\* cited by examiner

*Primary Examiner* — Seth Dumbris
(74) *Attorney, Agent, or Firm* — Crowell & Moring LLP

(57) ABSTRACT

A wear-resistant coating made from an iron alloy composition on brake disc brake surfaces is disclosed. The wear-resistant coating has 0.5 to 2% by weight C, 3 to 13% by weight Al and a residual portion of Fe supplementing the 100% by weight. A method for coating the brake disc is also disclosed.

9 Claims, No Drawings

BRAKE DISC COATING MADE FROM AN IRON ALLOY COMPOSITION AND METHOD FOR THE PRODUCTION THEREOF

BACKGROUND AND SUMMARY OF THE INVENTION

The invention relates to an iron alloy composition as a wear-resistant coating on a brake disc, a wear-resistant coated brake disc and the production thereof.

A wear-resistant, coated, substantially metallic vehicle component having a friction surface, for example a brake disc, is known from WO 03/104513 A1. The friction surface is formed by a wear-resistant top layer which substantially consists of molybdenum, wherein a typical composition has more than 99% molybdenum. A bonding layer is applied to the base substrate of the component in order to connect the top layer to the base substrate. However, a disadvantage of processing molybdenum is its high melting temperature and the high costs for molybdenum.

Therefore, for the vehicle component having the friction surface from WO 2007/043961 A1, the wear-resistant top layer is formed of an alloy which contains between 50 and 99% molybdenum, wherein the group consists of at least one of the following elements: Aluminum, boron, carbon, chromium, cobalt, lanthanum, manganese, nickel, niobium, oxygen, silicon, tantalum, tungsten, yttrium. This alloy has a liquidus temperature which is considerably lower than that of molybdenum, such that the alloy is completely or almost completely liquefied during thermal spraying, whereby the formation of a non-porous top layer is promoted. The thickness thereof is approximately 25 to 600 μm, preferably 300 μm. A connecting layer between the molybdenum top layer and the substrate substantially comprises a main portion of nickel and a low portion of aluminum. The thickness thereof can be between 0 and 100 μm, preferably approximately 50 μm.

DE 10 2008 035 849 A1 describes a method for coating brake surfaces of steel brake discs, in which a wear-resistant coating is applied to the roughened brake surfaces by thermal spraying. A spray material used for high-speed flame spraying is a ceramic-metal composite material made from tungsten carbide and a metal component, which either consists of cobalt, nickel or a cobalt or nickel alloy. In the arc spraying method, a coating made from Fe 18 Cr 8 Ni 2 Mn, Fe 13 Cr 0.5 Si or from alloyed carbon steel having a carbon content of approximately 0.35% as well as further alloy components in the form of Si, Ni, Mn, P (traces) and sulphur (traces) can be applied to the brake surfaces of the steel brake disc.

EP 1 336 054 B1 describes a brake disc and a method for the production thereof. Brake discs made from a cast iron material, for example grey cast iron having a carbon content of 3.7-4.0%, have an oxidation-resistant and wear-resistant, metallic, non-ceramic injection moulded coating made from a harder metal on at least one of the axial friction surfaces, for example a non-alloyed or alloyed steel which has carbide and oxide. The injection moulded coating can be produced by flame, arc or plasma spraying. The steel alloy used can contain Cr, the content of which in the coating can be between 10 and 20%. One composition of the coating steel has 16% Cr; 0.44% Ni; 0.43% Mn; 1.01% Mo and 0.36% C.

Based on this prior art, the object of the present invention is to provide an improved wear-resistant coating for the brake surfaces of a brake disc.

This object is solved by a wear-resistant coating on a brake disc of the present invention.

The further object of the invention, to create a brake disc whose friction surfaces link a high level of hardness with increased abrasion resistance, such that the formation of fine particles when braking is reduced, is solved by a brake disc of the present invention.

Developments of the alloy composition and the method are embodied in the respective sub-claims.

DETAILED DESCRIPTION OF THE INVENTION

An iron alloy composition according to the invention, which is provided to form a friction-resistant, wear-resistant layer on the brake surfaces or friction surfaces of a brake disc, has 0.5 to 2% b.w. C and 3 to 13% b.w. Al and a residual portion of Fe supplementing the 100% b.w. having inevitable trace impurities. Brake disc wear can be reduced with a wear-resistant layer on a brake disc which is created from this alloy composition. The wear-resistant layer is therefore the top material layer of the brake disc in the region of the friction surface. The brake disc arranged beneath the wear-resistant layer can therefore be constructed from several material layers, for example from a base material and an adhesive or corrosion-resistant layer made from a different material. If the brake disc is a light metal or aluminum alloy brake disc, then the coating made from this composition enables a significant reduction in the brake disc weight, since the base body of the brake disc can be designed to be narrower.

A further preferred iron alloy composition has 0.5 to 2% b.w. C and 3 to 13% b.w. Al, furthermore 0.5 to 5% b.w. Cr and/or 0.05 to 0.5% b.w. Si. The portion of Cr and Si leads, among other things, to the advantageous formation of hard phases in the coating alloy. The residual portion is Fe having the typical trace impurities in steels. Such a composition has the advantage that only readily available, cost-effective alloy elements are used. Expensive Mo or Ni is purposefully dispensed with.

In order to improve the deformability of the composition, the iron alloy compositions specified above can additionally have 0.5 to 5% b.w. Mn and alternatively or additionally 0.5 to 5% b.w. Ni. The ductility of the alloy matrix is improved by the addition of Ni.

In addition, the specified iron alloy compositions can have hard material formers such as, for example, W, V, Nb, B, each in the range from 0.1 to 3% b.w.

A further preferred iron alloy composition has 0.8 to 1.2% b.w. C, 6 to 8% b.w. Al, 1.5 to 2.5% b.w. Cr, 0.1 to 0.3% b.w. Si and a residual portion of Fe supplementing the 100% b.w. having inevitable trace impurities.

Unlike in the past, where series brake discs were subject to considerable wear and produced braking fine particles with the brake lining, the fine particles being formed on the rim in a visually unfavorable manner and being hard to remove, a wear-resistant layer formed from this composition appears to be substantially durably abrasion-resistant. The formation of fine particles can be reduced during braking by increased abrasion resistance. In addition, a brake disc coated with an iron alloy composition according to the invention has a markedly increased lifetime with constant braking effect.

The preferred iron alloy composition having 0.8 to 1.2% b.w. C, 6 to 8% b.w. Al, 1.5 to 2.5% b.w. Cr, 0.1 to 0.3% b.w. Si and a residual portion of Fe supplementing the 100% b.w.

can furthermore have 1.8 to 2.2% b.w. Mn to improve the deformability and/or 1.8 to 2.2% b.w. Ni to improve ductility.

The iron alloy composition can therefore be used to form a wear-resistant layer on brake disc brake surfaces, wherein the iron alloy composition is applied by thermal spraying on the brake surfaces.

The thermally sprayed iron alloy can above all have the following phases: α-Fe(Al, Si, Mn), $Fe_{4-x}Al_xC_y$, and $(FeCr)_3C$. Here, there is a high portion of hard material phases which create extremely good wear resistance. The element Al and its compounds in the coating have very good oxidation stability, such that very high stability against corrosion is achieved. The aluminum oxide formed during braking in heat counteracts the progress of the corrosion in the layer.

The expansion coefficient of the alloy composition is at the level of grey cast iron. Thermal stresses are thereby reduced when cost-effective grey cast iron is used as the brake disc substrate or base body.

The brake disc made from aluminum or an aluminum alloy or grey cast iron has, according to the invention, a wear-resistant layer made from an iron alloy composition according to the invention. The brake disc created in this way is characterized by increased abrasion resistance with the linked lower fine particle formation and increased lifetime with good oxidation resistance and corrosion resistance at the same time. If necessary, an intermediate layer can be applied between the base material of the brake disc and the wear-resistant layer. Here, this is an adhesive or corrosion-resistant layer. The preferred material for the intermediate layer is Ni or Ni alloys.

A method for the production of a brake disc coated with a wear-resistant layer starts with the production of a brake disc base body, whereupon the brake surface(s) to be coated are roughened in order to enable better adhesion of the subsequently sprayed protective layer to the brake disc base body. After applying the wear-resistant layer made from an iron alloy composition according to the invention to the roughened brake surface(s) by means of a thermal spraying process, thermal and/or mechanical after-treatment of the wear-resistant layer takes place to improve ductility and compression of the wear-resistant layer. If necessary, an intermediate layer can be applied between the base material of the brake disc and the wear-resistant layer. Here, this is an adhesive or corrosion-resistant layer. The intermediate layer, in particular in the case of an Ni alloy, can be applied galvanically or as a spray coating.

The thermal and/or mechanical after-treatment can be a thermomechanical after-treatment such as hammering or rolling the applied coating at increased temperatures in the range between 800 and 950° C., preferably at temperatures of 850 to 900° C. Alternatively or additionally, removal can take place subsequently at a temperature in the range from 850 to 950° C., preferably at approximately 900° C., over a period of between 0.5 and 3 hours, preferably 1 hour for the (further) increase in ductility, since a rounding/molding of the brittle hard material phases takes place by means of this tempering step.

The brake disc base body can be produced in a cost-effective manner from grey cast iron or with a lightweight design from cast aluminum. To roughen the brake or friction surfaces before coating, mechanical methods can preferably be used, for example particle beams (for example sandblasting), high-pressure water jets or by using a cutting tool with a defined cutting edge which preferably also creates indentations, such that the subsequently sprayed coating is cottered to the brake disc base body and as such the adhesion of the wear-resistant layer is further improved.

Various methods are possible as thermal spraying methods such as, for example, atmospheric plasma spraying, flame spraying, high-speed flame spraying or arc wire spraying, wherein atmospheric plasma spraying may be preferred when the iron alloy composition is present as a powder. However, if the iron alloy composition is present as a wire, arc wire spraying is preferred due to the homogeneity of the spraying layer which can be achieved and the costs.

The invention claimed is:

1. A wear-resistant layer made from an iron alloy composition, wherein the wear-resistant layer is a thermally sprayed coating on a brake disc in a region of a friction surface of the brake disc, comprising:
   0.5% to 2% by weight C;
   3% to 13% by weight Al; and
   a residual portion of Fe and trace impurities to obtain 100% by weight.

2. The wear-resistant layer according to claim 1, further comprising 0.5% to 5% by weight Cr and/or 0.05% to 0.5% by weight Si.

3. The wear-resistant layer according to claim 1, further comprising:
   0.5% to 5% by weight Mn; and/or
   0.5% to 5% by weight Ni; and/or
   0.1% to 3% by weight each of W, V, Nb and/or B.

4. An iron alloy composition of a wear-resistant layer on a brake disc brake surface, comprising:
   0.8% to 1.2% by weight C;
   6% to 8% by weight Al;
   1.5% to 2.5% by weight Cr;
   0.1% to 0.3% by weight Si; and
   a residual portion of Fe and trace impurities to obtain 100% by weight.

5. The iron alloy composition according to claim 4, further comprising 1.5% to 2.5% by weight Mn and/or 1.5% to 2.5% by weight Ni.

6. A brake disc, comprising:
   a wear-resistant layer according to claim 1; and
   an intermediate layer of a Ni alloy disposed between a base material of the brake disc and the wear-resistant layer.

7. A method for producing a brake disc, comprising the steps of:
   roughening a brake surface of the brake disc to be coated to form a roughened brake surface;
   applying a wear-resistant layer according to claim 1 to the roughened brake surface by a thermal spraying process; and
   after the applying, improving ductility of the wear-resistant layer by thermal and/or mechanical after-treatment of the wear-resistant layer.

8. The method according to claim 7, wherein the thermal and/or mechanical after-treatment comprises:
   hammering or rolling the wear-resistant layer at a temperature in a range from 800° C. to 950° C.; and/or
   rounding of brittle hard material phases of the wear-resistant layer at a temperature in a range from 850° C. to 950° C. over a period of 0.5 hour to 3 hours.

9. The method according to claim 7, wherein:
   a base body of the brake disc is produced from grey cast iron or cast aluminum;
   the roughening takes place by particle beams, high-pressure water jets, or by a cutting tool; and the thermal spraying process is atmospheric plasma spraying, flame spraying, high-speed flame spraying, or arc wire spraying.

\* \* \* \* \*